United States Patent [19]

Kluger

[11] 4,220,227
[45] Sep. 2, 1980

[54] DRUM BRAKE AUTOMATIC ADJUSTER

[75] Inventor: Michael A. Kluger, South Bend, Ind.

[73] Assignee: The Bendix Corporation, Southfield, Mich.

[21] Appl. No.: 973,370

[22] Filed: Dec. 26, 1978

[51] Int. Cl.³ .................................. F16D 65/56
[52] U.S. Cl. ..................... 188/196 BA; 188/79.5 P
[58] Field of Search ............. 188/79.5 P, 79.5 GE, 188/79.5 GT, 196 BA

[56] References Cited

U.S. PATENT DOCUMENTS

| | | | |
|---|---|---|---|
| 3,554,332 | 1/1971 | Harrison | 188/196 BA |
| 3,794,145 | 2/1974 | Margetts | 188/196 BA |
| 4,101,011 | 7/1978 | Burnett | 188/196 BA |
| 4,139,083 | 2/1979 | Hoshino et al. | 188/79.5 P |

FOREIGN PATENT DOCUMENTS

| | | | |
|---|---|---|---|
| 2262926 | 6/1974 | Fed. Rep. of Germany | 188/79.5 P |
| 1327199 | 8/1973 | United Kingdom | |

Primary Examiner—Edward R. Kazenske
Attorney, Agent, or Firm—Paul David Schoenle; Ken C. Decker

[57] ABSTRACT

A drum brake assembly includes a pair of brake shoes which are movable by a hydraulic actuator to a position engaging a rotatable member. A backing plate supports the hydraulic actuator and carries an anchor to pivotally support the pair of brake shoes relative to the backing plate. In order to maintain a predetermined running clearance between the pair of brake shoes and the rotatable member, an extendible member cooperates with the brake shoes to limit retraction of the latter. A pawl pivotally engages one of the brake shoes and the extendible member to provide for extension of the extendible member and a resilient member is engageable with the pawl to extend the extendible member and also to retract the pair of brake shoes. The pawl also releasably connects with the extendible member and the one brake shoe when the resilient member is engageable with the pawl. When the resilient member is disengageable from the pawl, the pawl is free to separate from the extendible member and the one brake shoe. Moreover, the pawl defines a floating connection with the one brake shoe and the extendible member so as to tilt into engagement with a ratchet wheel on the extendible member when the resilient member is engageable with the pawl. In particular the floating connection is defined by axial clearances between the pawl and extendible member and between the pawl and one brake shoe.

5 Claims, 3 Drawing Figures

DRUM BRAKE AUTOMATIC ADJUSTER

BACKGROUND OF THE INVENTION

A non-servo drum brake assembly is illustrated in U.S. Pat. Nos. 3,717,227 and 4,101,011 wherein an extendible strut is disposed between a pair of brake shoes to control the running clearance between the pair of brake shoes and a drum. A pawl with an arm cooperates with a ratchet wheel on the extendible strut to provide for extension of the extendible strut when the clearance between the pair of brake shoes and the drum is above the running clearance. The pawl is pivotally fixed to either one of the pair of brake shoes or a parking lever. Consequently, in order to assemble the nonservo drum brake assembly of the prior art, the pawl must be pivotally fastened for permanent attachment to a brake shoe or a parking lever.

In addition, the pawl includes an arm for engagement with a ratchet wheel. As the pawl pivots relative to the extendible strut the arm indexes to adjoining teeth to provide for incremental adjustment when the clearance between the pair of brake shoes and the drum is above a predetermined clearance. Consequently, it is important to retain the pawl arm in engagement with the ratchet wheel, or else the strut will stay the same length regardless of the lining wear of the brake shoes.

SUMMARY OF THE INVENTION

The present invention relates to an improvement in an automatic adjuster for a nonservo drum brake assembly wherein an extendible member cooperates with a pair of brake shoes to limit retraction of the latter. A pawl pivotally connects with the extendible member and one of the pair of brake shoes and an arm on the pawl is engageable with a ratchet wheel on the extendible member. The one brake shoe and extendible member cooperate with the pawl to form floating connections therewith so that a resilient member, which is engageable with the pawl, will pivot and tilt the pawl so as to resiliently bias the arm into engagement with the ratchet wheel.

In particular, a pin extends from the one brake shoe and a slot is formed on the extendible member. The pawl includes a slot for receiving the pin and a portion of the pawl is disposed within the extendible member slot. The pawl cooperates with the pin and the extendible member slot to define axial clearances therebetween which permit pivoting of the pawl in a horizontal plane. When the one brake shoe moves relative to the extendible member, the pawl is also pivotal in a vertical plane.

Moreover, the resilient member cooperates with the pair of brake shoes and the extendible member to releasably couple the pawl to the one brake shoe and to the extendible member. When the resilient member is disengaged from the pawl, the pawl is free to separate from the one brake shoe and the extendible member.

It is an object of the present invention to provide an improved automatic adjuster for a non-servo drum brake.

More specifically, it is an object of the present invention to provide a non-servo drum brake assembly which is easy to assemble and/or disassemble and also to releasably connect a pawl with a brake shoe and an extendible member such that an arm on the pawl is resiliently biased into engagement with a ratchet wheel on the extendible member.

DETAILED DESCRIPTION

Figure 1:
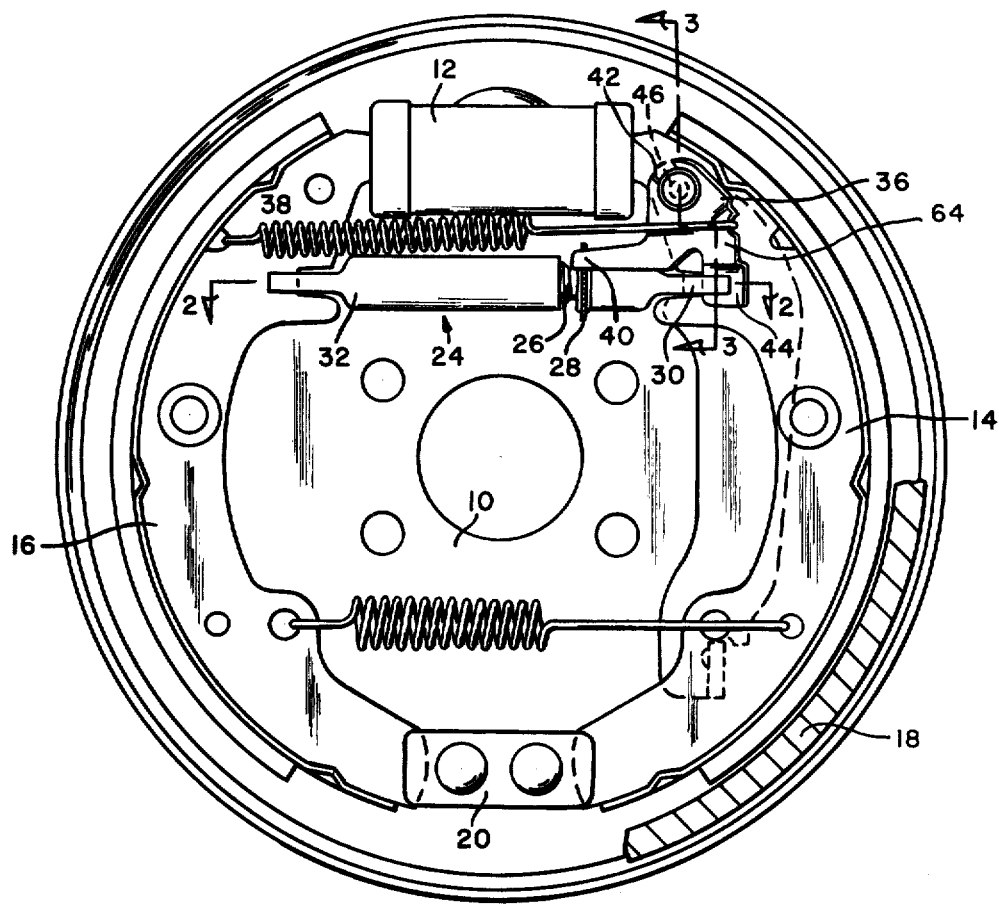
FIG. 1 is a front view of a drum brake assembly including the features of the present invention.

The drum brake assembly of FIG. 1 shows a non-servo drum brake with an extendible strut and adjusting pawl to automatically adjust for lining wear in a pair of brake shoes.

A backing plate 10 supports a hydraulic actuator 12 which is operable to move a pair of brake shoes 14 and 16 from a non-braking position to a braking position in engagement with a drum 18. The pair of brake shoes are pivotally anchored by a plate 20 attached to the backing plate 10 to transmit torque developed during braking to the backing plate 10.

An extendible member or strut 24 extends between the pair of brake shoes to define a non-braking position and to limit retraction of the pair of brake shoes upon termination of braking. The strut comprises a threaded member 26 with a ratchet wheel 28 which is rotatable relative to a pair of end portions 30 and 32, one of which threadably engages the threaded member 26. As is well known in the art the ratchet wheel 28 rotates relative to the portions 30 and 32 so as to extend the length of the strut 24. A pawl 36 cooperates with a resilient member 38 to engage an arm 40 with the ratchet wheel 28.

In accordance with the invention the pawl 36 includes a slot 42 and an end 44 in abutment with the strut portion 30. Upon assembly, the slot 42 is fitted over a pin 46 extending from the one brake shoe 14 and the end 44 is disposed in abutment with the extendible strut end 30 before the resilient member 38 is disposed between the other brake shoe 16 and the pawl 36. Consequently, no tool or permanent fastening is required to connect the pawl to the one brake shoe and extendible strut. Thereafter, the resilient member 38 is disposed in engagement with the other brake shoe 16 and the pawl 36 to releasably retain the pawl in connection with the one brake shoe 14 via pin 46 and with the strut 24 via the portion 30.

Figure 2:
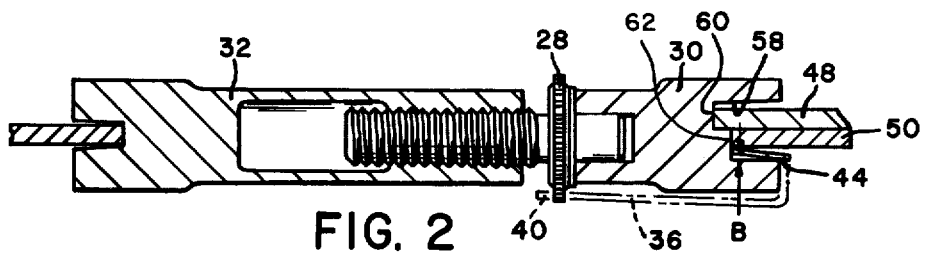
FIG. 2 is an enlarged cross-sectional view taken along line 2—2 of FIG. 1.
Figure 3:
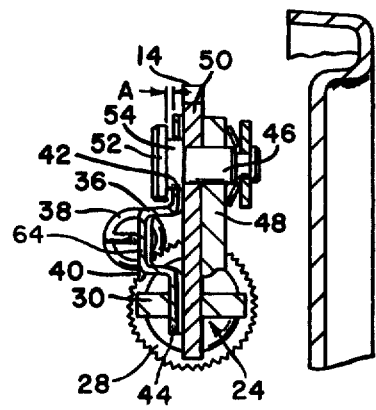
FIG. 3 is an enlarged cross-sectional view taken along line 3—3.

Turning to FIG. 3, the pin 46 pivotally supports a parking lever 48 on an axially inner side of a web 50 of the one brake shoe 14. A flange 52 on the pin 46 cooperates with the web 50 to define a groove 54 for receiving the pawl 36. The axial dimension of the groove 54 is larger than the axial width of the pawl 36 adjacent the slot 42 so as to form an axial clearance or gap A. The end 44 of the pawl 36 is received in a slot 58 on the strut portion 30. The slot 58 also receives the parking lever 48 which is in abutment with a first bottom 60 and the web 50 extends into the slot 58 to oppose a second bottom 62, as shown in FIG. 2. The axial dimension of the slot 58 is larger than the combined axial width of the parking lever 48, web 50 and pawl end 44, so as to form an axial clearance or gap B. In accordance with a further feature of the invention, the gaps A and B cooperate with the pawl 36 to permit the latter to tilt in a horizontal plane which is substantially perpendicular to a vertical braking plane defined by the web 50. The tilting of the pawl 36 is accomplished by the resilient member 38 when the latter is engageable with the pawl 36 and the other brake shoe 16. The resilient member 38 is engageable with a portion 64 of the pawl 36 and the portion is disposed axially outwardly of the slot 42 and the end 44.

With the pawl being tilted in a horizontal plane by the resilient member 38 the arm 40 is biased axially inwardly to resiliently engage the ratchet wheel 28. Consequently, the arm 40 follows the circular path of the edge of the ratchet wheel 28, viewing FIG. 3.

The dimensions of the gaps A and B are believed to be critical for proper automatic adjustment as too small or too large a gap will prevent proper adjustment. For example, in an 8" diameter drum brake the automatic adjuster functioned properly when the dimension of the gaps A and B was between 0.010 inch and 0.050 inch. The automatic adjuster operated most satisfactorily when the dimension of the gaps A and B was about 0.035 inch.

Once the pawl 36 is releasably connected to the one brake shoe 14 and the adjustable strut 24 via the resilient member 38, so that the pawl 36 is tilted to resiliently engage the arm 40 with the ratchet wheel 28, the drum brake operates in the same manner as described in U.S. Pat. No. 4,101,011 to effectuate braking and automatically take up lining wear for the pair of brake shoes.

What is claimed is:

1. In a drum brake assembly, a rotatable brake drum, a pair of brake shoes mounted adjacent said drum and movable into frictional engagement therewith when a brake application is effected, an extendible strut between said brake shoes for limiting movement of the brake shoes away from the drum when the brake is released, a pawl cooperating with said extendible strut to extend the latter to compensate for wear of the brake shoes to thereby maintain a substantially constant clearance between the shoes and the drum, a resilient member yieldably urging the brake shoes toward their retracted position engaging said strut, a pivot pin securing said pawl to one of said brake shoes, said pivot pin having larger and smaller portions with a shoulder therebetween to engage said brake shoe when said smaller portion is installed thereon, said pivot pin having a flange, said larger portion cooperating with the shoulder and said flange to define a gap therebetween, said pawl being pivotally mounted in a first plane on said larger portion of the pivot pin, said gap being wider than the thickness of the pawl to permit the latter to tilt relative to the pivot pin in a second plane at an angle relative to said first plane, said resilient member engaging the pawl to impart rotation and tilt to the pawl in said first and second planes, respectively, said extendible member having a slot for receiving a portion of one of said brake shoes, said slot having a pair of side edges, and means carried by said slot and by said brake shoe for locating said portion of said one brake shoe in a predetermined position in said slot with respect to one of the side edges thereof whereby said portion of said one brake shoe cooperates with said one side edge of the slot to define a space of predetermined width therebetween, said pawl having a portion received in said space, the thickness of the pawl being less than the width of the space to permit tilting of the pawl with respect to the strut within predetermined limits established by said one edge of the slot and the portion of said one brake shoe.

2. The drum brake assembly of claim 1 in which the pawl includes an arm which is engageable with the extendible strut to provide for the extension of the extendible strut and the resilient member cooperates with the pawl to bias said arm into engagement with the extendible strut.

3. The drum brake assembly of claim 1 in which the pair of brake shoes includes webs which substantially define a braking plane, said braking plane being parallel to said first plane and said second plane being substantially perpendicular to said braking plane.

4. The invention of claim 1:
wherein said locating means includes a stepped bottom edge of said slot and a member carried by the one brake shoe for engaging the shoulder defined between the steps of said bottom edge.

5. The invention of claim 4:
wherein said member is a parking lever pivotally mounted on said one brake shoe and engageable with said strut to effect a parking application.

* * * * *